United States Patent
Mambretti et al.

(10) Patent No.: US 12,554,833 B2
(45) Date of Patent: Feb. 17, 2026

(54) PERFORMANCE MONITORING UNIT FOR TRANSIENT INSTRUCTION EXECUTION

(71) Applicant: INTERNATIONAL BUSINESS MACHINES CORPORATION, Armonk, NY (US)

(72) Inventors: Andrea Mambretti, Zurich (CH); Anil Kurmus, Zurich (CH); Alessandro Sorniotti, Zurich (CH); Marc PH. Stoecklin, Richterswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 18/426,674

(22) Filed: Jan. 30, 2024

(65) Prior Publication Data
US 2025/0245317 A1    Jul. 31, 2025

(51) Int. Cl.
*G06F 21/52*    (2013.01)
*G06F 9/38*    (2018.01)

(52) U.S. Cl.
CPC ............ *G06F 21/52* (2013.01); *G06F 9/3802* (2013.01); *G06F 9/382* (2013.01); *G06F 9/3867* (2013.01)

(58) Field of Classification Search
CPC ........ G06F 21/00; G06F 21/52; G06F 9/3802; G06F 9/382; G06F 9/3867
See application file for complete search history.

(56) References Cited

U.S. PATENT DOCUMENTS 6,446,029 B1 *   9/2002   Davidson ............ G06F 11/3409
                                           702/182
7,496,908 B2      2/2009   DeWitt, Jr. et al.
(Continued)

FOREIGN PATENT DOCUMENTS

CN          115357912 A    11/2022
WO    WO2019140274 A1    7/2019

OTHER PUBLICATIONS

L. Zhao et al., "Exploiting Security Dependence for Conditional Speculation Against Spectre Attacks," in IEEE Transactions on Computers, vol. 70, No. 7, pp. 963-978, Jul. 1, 2021, doi: 10.1109/TC.2020.2997555. (Year: 2021).*

(Continued)

*Primary Examiner* — Patrice L Winder
(74) *Attorney, Agent, or Firm* — Edward J. Wixted, III, Esq.; Blanche E. Schiller, Esq.; Heslin Rothenberg Farley & Mesiti P.C.

(57) ABSTRACT

Instruction processing information is obtained for an instruction of a computer program being executed by a processor of a computing environment. Based on obtaining the instruction processing information, a determination is made that the instruction is an identified instruction selected to be tracked as the instruction proceeds through one or more instruction pipeline stages of a micro-architecture of the processor. Based on ascertaining that the identified instruction is transient, one or more counters of a performance monitoring unit are updated to reflect processing of the identified instruction in at least one instruction pipeline stage of the one or more instruction pipeline stages. Information from the one or more counters is provided and is to be analyzed to determine a path of the identified instruction that is transient. The path is to be used to determine whether one or more vulnerabilities exist within the program.

20 Claims, 6 Drawing Sheets

(56) References Cited

U.S. PATENT DOCUMENTS

| | | | |
|---|---|---|---|
| 8,595,389 | B2 | 11/2013 | Davis et al. |
| 8,607,228 | B2 | 12/2013 | Cota-Robles et al. |
| 8,615,619 | B2 | 12/2013 | DeWitt, Jr. et al. |
| 9,069,891 | B2 | 6/2015 | Salapura et al. |
| 9,213,831 | B2* | 12/2015 | Sridhara ............... G06F 9/3861 |
| 9,489,229 | B2 | 11/2016 | Gschwind |
| 2012/0233442 | A1* | 9/2012 | Shah .................... G06F 9/3851 |
| | | | 712/E9.055 |
| 2018/0349144 | A1* | 12/2018 | Pal ...................... G06F 9/3848 |
| 2019/0042746 | A1* | 2/2019 | Nayshtut ............... G06F 21/565 |
| 2019/0303263 | A1 | 10/2019 | Fleming, Jr. et al. |
| 2019/0311129 | A1* | 10/2019 | Clifton .................. G06F 21/57 |
| 2021/0081575 | A1* | 3/2021 | Saileshwar ............... G06F 8/41 |
| 2022/0198023 | A1 | 6/2022 | Gopinath et al. |
| 2022/0206819 | A1 | 6/2022 | Pokam et al. |

OTHER PUBLICATIONS

K. Arkan et al., "Processor Security: Detecting Microarchitectural Attacks via Count-Min Sketches," in IEEE Transactions on Very Large Scale Integration (VLSI) Systems, vol. 30, No. 7, pp. 938-951, Jul. 2022, doi: 10.1109/TVLSI.2022.3171810. (Year: 2022).*

Lipp, et al., "Meltdown", Cryptography and Security, arXiv:1801.01207v1, Jan. 3, 2018, 16 Pages.

Qiu, Pengfei et al., "PMUSpill: The Counters in Performance Monitor Unit that Leak SGX-Protected Secrets," Jul. 24, 2022, pp. 1-13.

Mambretti, Andrea et al., "Speculator: A Tool to Analyze Speculative Execution Attacks and Mitigations," 2019 Annual Computer Security Applications Conference (ACSAC'19), Dec. 2019, pp. 747-761.

Kocher, Paul et al., "Spectre Attacks: Exploiting Speculative Execution," 2019 IEEE Symposium on Security and Privacy, May 2019, pp. 1-19.

Das, Sanjeev et al., "SoK: The Challenges, Pitfalls, and Perils of Using Hardware Performance Counters for Security," 2019 IEEE Symposium on Security and Privacy, May 2019, pp. 20-38.

Dhavlle, Abhijitt et al., "CR-Spectre: Defense-Aware ROP Injected Code-Reuse Based Dynamic Spectre," Mar. 2022, Abstract Only, pp. 1-4.

* cited by examiner

PERFORMANCE MONITORING UNIT FOR TRANSIENT INSTRUCTION EXECUTION

BACKGROUND

One or more aspects relate, in general, to processing within a computing environment, and in particular, to processing of transient instructions within the computing environment.

Modern superscalar central processing units employ speculative execution to increase the throughput of instructions executed per clock cycle. A superscalar central processing unit is one that concurrently manages multiple execution pipelines, with multiple execution units, thereby being able to execute more than one instruction per central processing unit cycle. Speculative execution corresponds to the central processing unit making a prediction as to what instructions shall be executed. For instance, a prediction may be that none of the prior, in program order, instructions would fault. Another prediction may be with respect to where control flow edges may lead (control flow prediction). Yet, another one may be with respect to aliasing addresses (data flow prediction).

These predictions, or speculatively executed instructions, can lead to large performance gains. For instance, for control flow predictions, whenever the central processing unit faces a stall due to a lack of readily available data, it tries to boost performance by guessing what will be the next executed instructions in the instruction stream (e.g., sequence of operations that compose a program, e.g., all instructions executed in program order). By hiding the latency from cache or DRAM (dynamic random access memory) accesses, this leads to large performance gains on programs when the predictions are correct.

When the predictions are incorrect, the executed instructions are rolled back. In other terms, they are not committed or retired: the results of these instructions are not intended to be visible outside the executing central processing unit core, i.e., at the architectural level. These instructions that are speculatively executed based on a misprediction are called transient.

Although the results of transient instructions are not intended to be visible at the architectural level, it has been determined that some micro-architectural side effects caused by transient execution can be observed by the running program at the architectural level using side channels.

SUMMARY

Shortcomings of the prior art are overcome, and additional advantages are provided through the provision of a computer program product for enhancing processing within a computing environment. The computer program product includes a set of one or more computer readable storage media and program instructions, collectively stored in the set of one or more computer readable storage media, for causing at least one computing device to perform the following computer operations. The computer operations include obtaining instruction processing information for an instruction of a computer program being executed by a processor of the computing environment. A determination is made based on obtaining the instruction processing information that the instruction is an identified instruction selected to be tracked as the instruction proceeds through one or more instruction pipeline stages of a micro-architecture of the processor. It is ascertained that the identified instruction is transient. Based on ascertaining that the identified instruction is transient, one or more counters of a performance monitoring unit coupled to the processor are updated to reflect processing of the identified instruction in at least one instruction pipeline stage of the one or more instruction pipeline stages. Information from the one or more counters is provided and is to be analyzed to determine a path of the identified instruction that is transient. The path is to be used to determine whether one or more vulnerabilities exist within the program.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of each computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
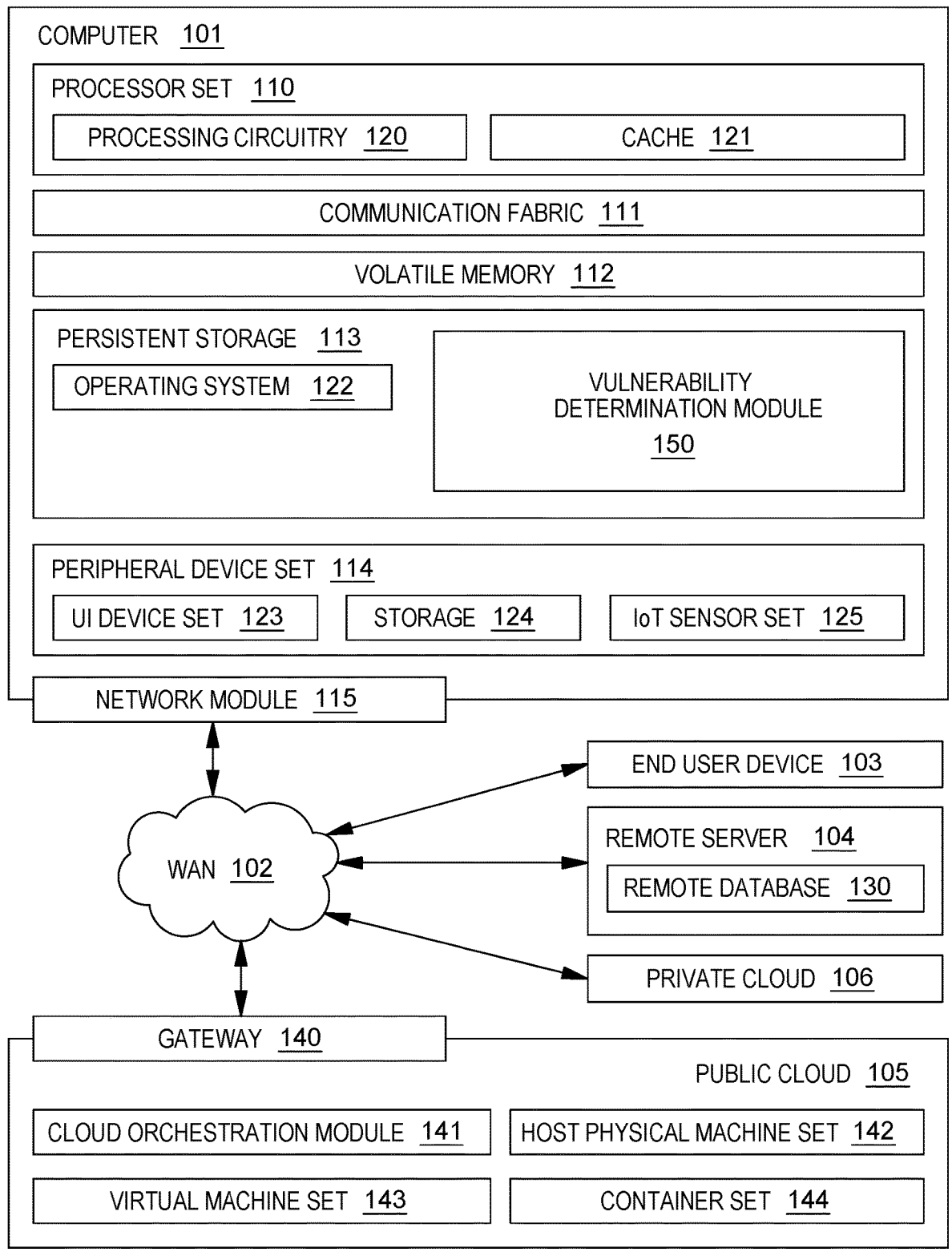
FIG. 1 depicts one example of a computing environment to incorporate and use one or more aspects of the present disclosure.

In accordance with one or more aspects of the present disclosure, a capability is provided to enhance processing within a computing environment. In one or more aspects, the capability includes extending a performance monitoring unit to include counters (e.g., hardware counters) to track for further analysis identified instructions of a selected type (e.g., transient). In one or more aspects, the identified transient instructions are tracked for a selected purpose. In one example, the selected purpose is vulnerability analysis and/or detection; however, in other examples, instruction tracking and/or analysis may be performed for other selected purposes.

In one or more aspects, the capability includes identifying the instructions for potential tracking for the selected purpose by, for instance, using a marker instruction, marking an existing instruction and/or otherwise identifying instructions for potential tracking. The identified instructions are selected for tracking for the selected purpose based on those instructions being transient (e.g., not committed; rolled back). In one or more examples, if an identified instruction is not transient, but instead a retired instruction (e.g., committed), it is not tracked for the selected purpose.

In one or more aspects, the identified transient instructions are tracked for the selected purpose using the performance monitoring unit, and in particular, one or more selected counters within the performance monitoring unit, to reflect execution of the identified transient instructions through various instruction pipeline stages. In one or more examples, an identified instruction is tracked for the selected purpose based on it being transient; however, it is not tracked for the selected purpose if it is not transient, but instead a retired instruction.

In one or more aspects, the counters (e.g., counter information provided by the counters) are analyzed to determine one or more paths of the identified transient instructions, and based on the paths, further analysis is performed to detect potential vulnerabilities, if any, in the program(s) including those instructions. Based on identifying any vulnerabilities, action is taken to prevent, address and/or mitigate such vulnerabilities. As an example, an action taken to mitigate such vulnerability is to delete (e.g., automatically by a processor) the memory footprint of the executed instruction resulting in the vulnerability. As another example, the action may be to modify the program that includes the executed instruction. The modification may be performed by, e.g., the compiler, a programmer, analyst, etc. Another action is to send (e.g., by the performance monitoring unit, processor, etc.) an alert regarding the vulnerability. Many other example actions are possible.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs, e.g., instruction tracking for a selected purpose, vulnerability determination processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as vulnerability determination code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
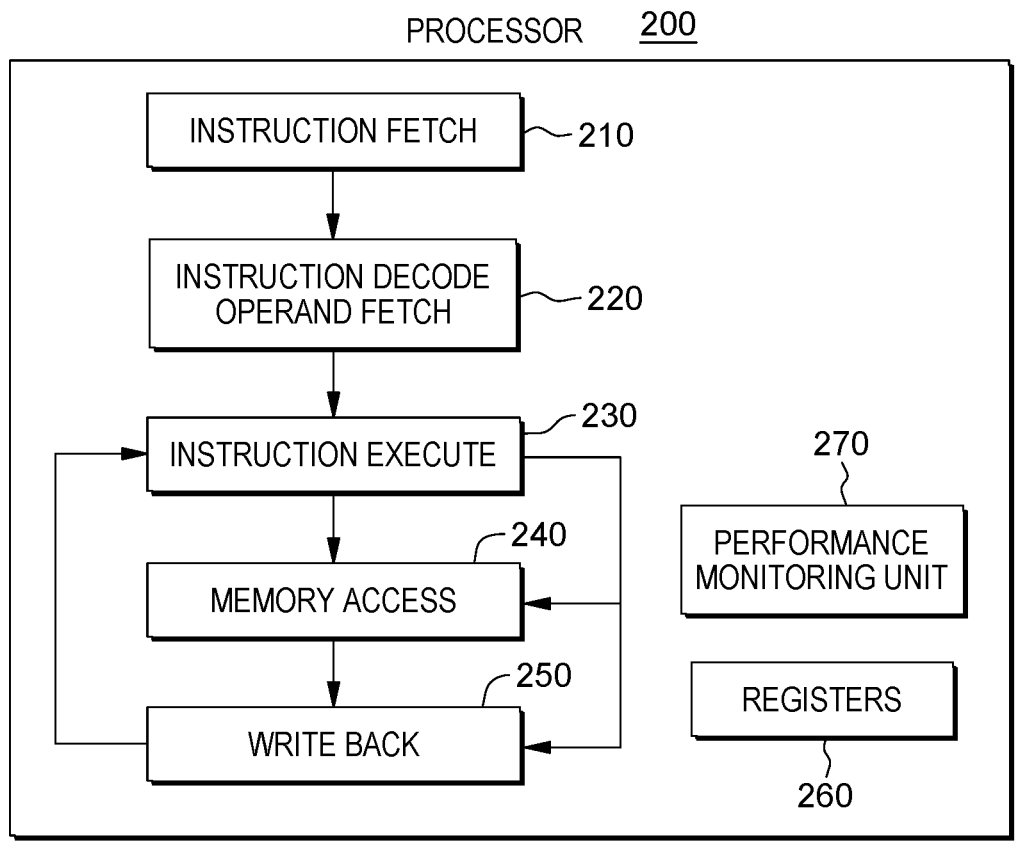
FIG. 2 depicts one example of further details of a processor of a processor set of FIG. 1, in accordance with one or more aspects of the present disclosure.

In one example, a processor (e.g., of processor set 110) includes a plurality of functional components (or a subset thereof and/or additional components) used to execute instructions. As depicted in FIG. 2, in one example, a processor 200 includes a plurality of functional components including, for instance, an instruction fetch component 210 to fetch instructions to be executed; an instruction decode/operand fetch component 220 to decode the fetched instructions and to obtain operands of the decoded instructions; one or more instruction execute components 230 to execute the decoded instructions; a memory access component 240 to access memory for instruction execution, if necessary; and a write back component 250 to provide the results of the executed instructions. One or more of the components may access and/or use one or more registers 260. Further, in accordance with one or more aspects, one or more of the components may be coupled to a performance monitoring unit 270 used to observe the performance of one or more identified instructions, as described in further detail herein. The performance monitoring unit may be part of the processor or separate therefrom but coupled to the processor. In either case, as used herein, the performance monitoring unit is coupled to the processor. Moreover, one or more of the components may access and/or use vulnerability determination module 150, in accordance with one or more aspects.

Although the vulnerability determination module is depicted in FIG. 1 in persistent storage, the module and/or one or more of the sub-modules may be located elsewhere, including, but not limited to, as part of the performance monitoring unit. Many examples are possible. Additionally, fewer and/or other components may be used in one or more aspects of the present disclosure.

As indicated, in one or more aspects, a performance monitoring unit is used to observe the performance of one or more identified instructions. The identified instructions are selected instructions (e.g., marked or otherwise identified) that are transient (i.e., are not retired, e.g., rolled back). These selected transient instructions are tracked in order to analyze execution of such instructions for a selected purpose, such as in an attempt to prevent unauthorized access within the computing environment. Other selected purposes are also possible.

Figure 3:
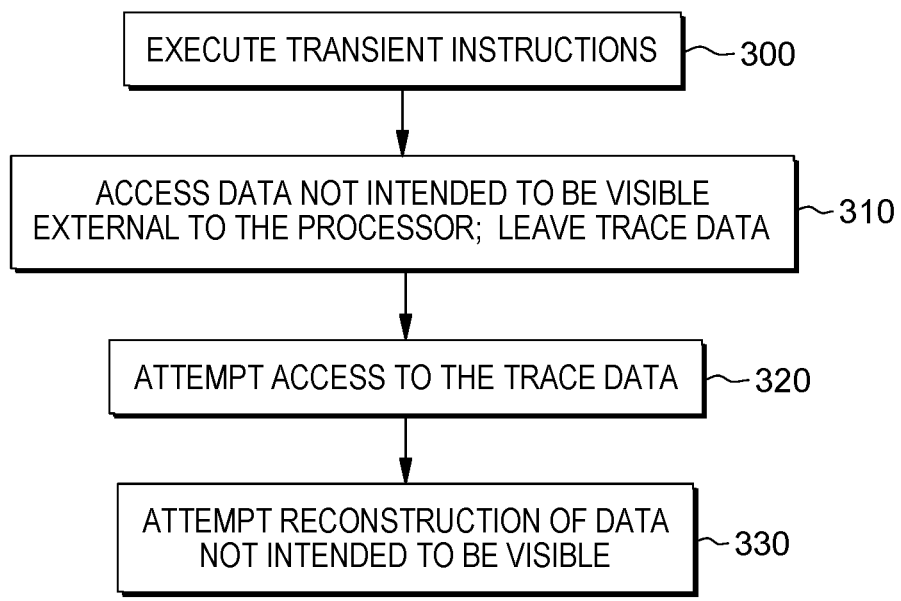
FIG. 3 depicts one example of a potential vulnerability resulting from transient execution of one or more instructions, in accordance with one or more aspects of the present disclosure.

During execution of transient instructions, one or more vulnerabilities (e.g., security issues) may be present in which data, instruction results and/or other information intended not to be visible external to the central processing unit (referred to as secrets or herein, as confidential information) may be discoverable by an unauthorized user (e.g., a user not authorized to access the confidential information) either intentionally or unintentionally. For instance, referring to FIG. 3, transient instructions are generated following one or more predictions by the central processing unit executing the instructions. During execution 300 of one or more transient instructions, confidential information (e.g., data not intended to be visible external to the processor) is accessed 310 by the one or more transient instructions leaving traces (e.g., trace data) in the micro-architecture (e.g., cache(s), branch predictors, etc.) that may be observed by an unauthorized user. The unauthorized user may attempt retrieval 320 of the trace data (also referred to as an unauthorized access) and/or attempt reconstruction 330 of the confidential data based on the trace data.

To protect the confidential information and prevent unauthorized accesses, in one or more aspects, an understanding of transient instruction execution is to be obtained. This understanding is hampered by the fact that the trace data is at the micro-architecture level, rather than the architectural level, and the micro-architecture level is not meant to be observed by programs running at the architectural level. Thus, previously, to access and study the trace data, reverse engineering was performed using side channels. Side channels infer information about confidential information (e.g., a secret) by observing non-functional characteristics of a program, such as execution time or memory consumed, as examples. Side channels are cumbersome to setup, slow to run and the results are subjected to noise from the system, and thus, observations are repeated several times to remove the noise. Therefore, in accordance with one or more aspects, to gain insight into the behavior of the micro-architecture, performance monitoring unit 270 is extended at the hardware level to include application programming interfaces (APIs) to be used to study the behavior of transient execution in a faster and more deterministic manner. The performance monitoring unit is coupled to a central processing unit (e.g., located within a central processing unit and/or coupled thereto) and records various events occurring within the components of the micro-architecture. Further details of one example of a performance monitoring unit are described below.

Figure 4:
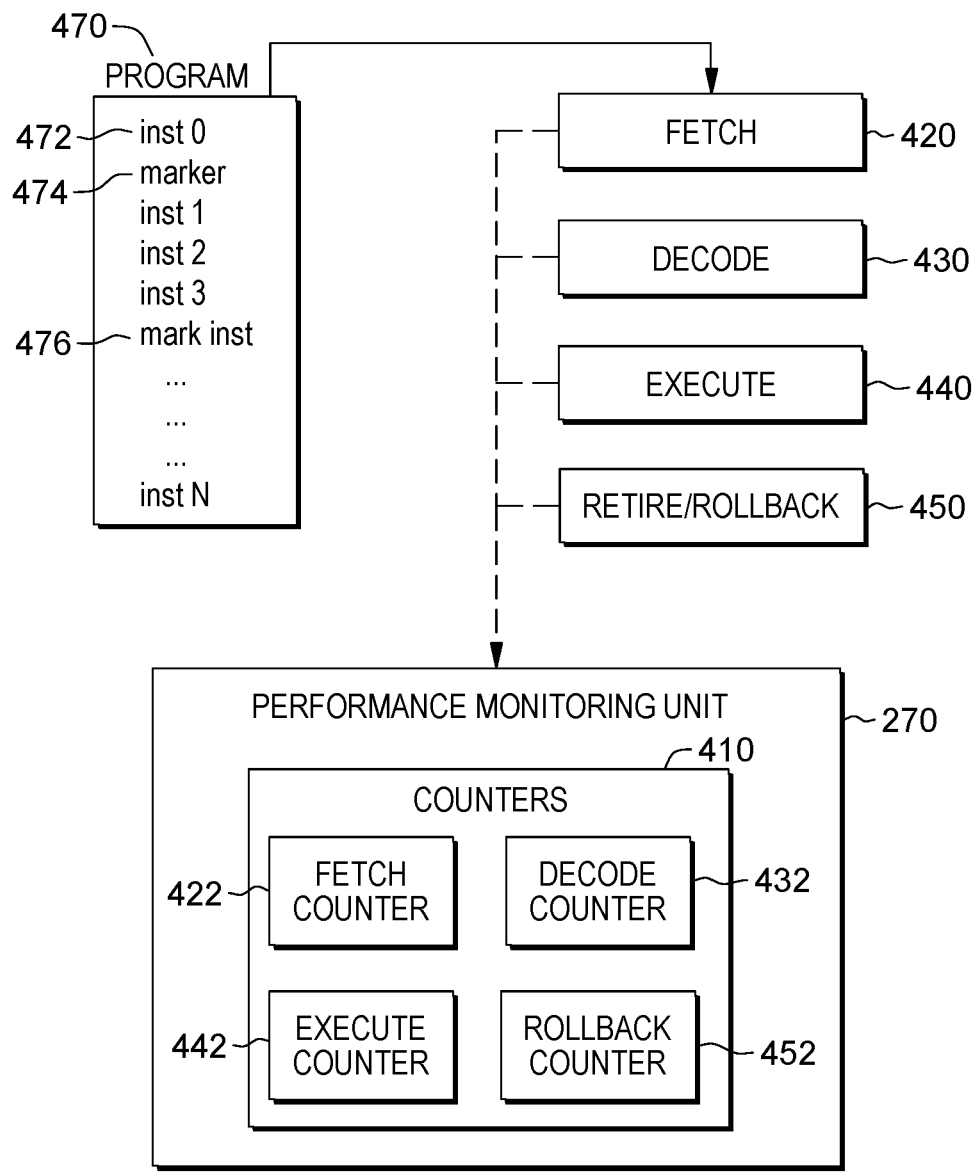
FIG. 4 depicts one example of a performance monitoring unit extended for one or more aspects of the present disclosure.

In one embodiment, referring to FIG. 4, a performance monitoring unit 270 includes one or more counters 410 (e.g., hardware counters) used to indicate how a transient instruction proceeds through the micro-architecture. For instance, one or more counters 410 include a counter for each instruction pipeline stage of the micro-architecture, including, for instance, fetch 420, decode 430, execute 440 and retire/rollback 450. Thus, in one example, counters 410 include, for instance, a fetch counter 422, a decode counter 432, an execute counter 442 and a rollback counter 452. In other embodiments, counters 410 may also include a retire counter and/or additional or less counters than one for each stage. Many variations are possible.

In one or more aspects, the performance monitoring unit extended with the counters for the micro-architecture instruction pipeline stages provides an ability to reliably observe the behavior of transient execution and side effects. The performance monitoring unit, via one or more application programming interfaces, receives instruction processing information (e.g., instruction identifier, an indication of whether the instruction is marked for tracking, etc.) from the micro-architecture regarding an instruction being executed, and based thereon, determines whether one or more of counters 410 are to be updated. In one or more aspects, one or more of the counters are updated for specific identified instructions, exclusively (e.g., selected instructions that are marked and/or otherwise identified). These identified instructions are designed and/or selected for the purpose of observing transient execution. Further, in one or more aspects, the one or more counters are to represent only those identified instructions that are transient (e.g., did not commit and were rolled back). Thus, in one or more aspects, if an identified instruction retires (e.g., is committed and not rolled back), then the counters (other than possibly a retire counter, if used) do not reflect the execution of the instruction. For instance, if an identified instruction is proceeding through the instruction pipeline stages of the micro-architecture and a particular counter (e.g., one of counters 422, 432 and/or 442) is, e.g., incremented (e.g., by one, another amount, etc.) based on the identified instruction proceeding through that stage and then that instruction retires, the particular counter is decremented such that execution of the selected instruction is not tracked. However, if the identified instruction proceeding through the stages is rolled back, then the one or more counters that were updated during the pipeline stages remain updated tracking the identified instruction that is transient.

In another example, the counters are not actually updated during the stages until the retire/rollback stage, but the performance monitoring unit is aware of the processing track of the instruction. Then, based on the instruction rolling back, the appropriate counters are updated (e.g., incremented; e.g., by one, another amount, etc.). If, however, the instruction retires, then the counters are not updated, except possibly a retire counter, if used. Other examples are possible.

In one example, each identified instruction has a set of counters (e.g., counters 422, 432, 442 and 452) assigned thereto, such that there is an identified instruction/counters pair. For instance, one set of counters (e.g., counters 422-452) is used by one identified instruction, and another set of counters is used by another identified instruction, etc. As an example, the number of sets of counters is predefined. Other examples are possible. The use of sets of counters enables identified instructions to be placed at multiple locations within the program to collect additional data (e.g., a path of a particular instruction, etc.). Other examples are possible.

To determine which instructions are to be identified as being of interest for observation, an instruction indication is used. In one example, the instruction indication is a marker that may be included within a program. For instance, as depicted in FIG. 4, a program 470 includes a plurality of instructions 472, as well as a marker instruction 474. The marker instruction may be embedded within the program by the compiler, a programmer, analyst, etc., and includes, for instance, an operation code indicating that it is a marker operation but no other operands, in this example. It works like a no-operation (no-op; does not modify the architectural state) as it travels through the micro-architecture instruction pipeline stages. As it is executed and proceeds through each stage, in one example, a counter for that stage (and for that instruction, in one example) in the performance monitoring unit is incremented. For instance, when the marker instruction is fetched in fetch stage 420, fetch counter 422 is incremented (e.g., by 1 or another number); when it is decoded in decode stage 430, decode counter 432 is incremented (e.g., by 1 or another number); when executed in execute stage 440, execute counter 442 is incremented (e.g., by 1 or another number); and if rolled back in rollback stage 450, rollback counter 452 is incremented (e.g., by 1 or another number). In one example, there are a fetch counter 422, decode counter 432, execute counter 442 and rollback counter 452 for the marker instruction, and other such counters for other identified instructions. In another example, each identified instruction uses the same set of counters. Other examples are possible.

In one embodiment, if the marker instruction retires, then each of the counters that has been incremented is reduced (e.g., by 1 or another number), such that execution of the marker instruction is not tracked. Further, in one example, a retire counter may be incremented (e.g., by 1 or another number) to track that the marker instruction executed and retired. Other examples are also possible.

In one example, the other instructions in the program (other than marker instructions and/or other identified instructions) are not counted by the counters.

In one example, instead of and/or in addition to the marker instruction, an instruction may be specified for tracking/counting by using a prefix marker indicator, as shown at 476. This mark indicator may be embedded within the program by the compiler, a programmer, analyst, etc. As this marked instruction proceeds through the micro-architecture instruction pipeline stages, it is counted, similar to marker instruction 474. Again, the other instructions in the program (other than marker/marked/identified instructions) are not counted by the counters.

In another embodiment, instead of providing indications, such as markers, in the program, the performance monitoring unit is modified to track specific instructions. For instance, given one or more virtual code addresses specified through, e.g., a model specific register (e.g., by the user), the micro-architecture logs the identified instruction reaching a given instruction pipeline stage. An additional trigger is added, e.g., via model specific registers, to enable and disable the generation of such events only when desired. For instance, this could generate a microcode assist for the instructions decoded at that specific location. That is, when the program counter of the decoded instruction is equal to the previous model specific register-specific code address, the central processing unit increments the corresponding performance counter as long as the corresponding identified instruction is not retired. Alternatively, this can be implemented at other stages. For example, during instruction execution, instead of or in addition to decoding, and/or other stages. In one example, the counter is only incremented when the instruction is rolled back. These newly generated events can therefore be used to mark the traversing of the pipeline of an identified instruction without modifying the input instruction stream near the speculation experiment. Other variations are possible.

In one or more aspects, the counters are analyzed to determine the path(s) of identified instruction(s) to determine whether there are vulnerabilities (e.g., security concerns) in the program and/or within the processor (or for other selected purposes). Further details regarding determining whether vulnerabilities exist are described below.

In one example, to determine the existence of one or more vulnerabilities, a vulnerability determination module (e.g., vulnerability determination module 150) is used, in accordance with one or more aspects of the present disclosure. A vulnerability determination module (e.g., vulnerability determination module 150) includes code or instructions used to perform vulnerability determination processing and/or other processing, in accordance with one or more aspects of the present disclosure. A vulnerability determination module (e.g., vulnerability determination module 150) includes, in one example, various sub-modules to be used to perform processing of one or more aspects of the present disclosure. The sub-modules are, e.g., computer readable program code (e.g., instructions) in computer readable storage media, e.g., storage (persistent storage 113, cache 121, storage 124, other storage, as examples) and/or computer readable program code, logic and/or circuits in the processor, performance monitoring unit, etc. Many examples are possible. The computer readable storage media may be part of one or more computer program products and the computer readable program code may be executed by and/or using one or more computing devices (e.g., one or more computers, such as computer(s) 101; one or more servers, such as remote server(s) 104; one or more devices, such as end user device(s) 103; one or more processors or nodes, such as processor(s) or node(s) of processor set 110; processing circuitry, such as processing circuitry 120 of processor set 110; a performance monitoring unit (e.g., performance monitoring unit 270) and/or other computing devices, etc.). Additional and/or other computers, servers, devices, processors, nodes, processing circuitry and/or computing devices may be used to execute one or more of the sub-modules and/or portions thereof. Many examples are possible.

Figure 5A:
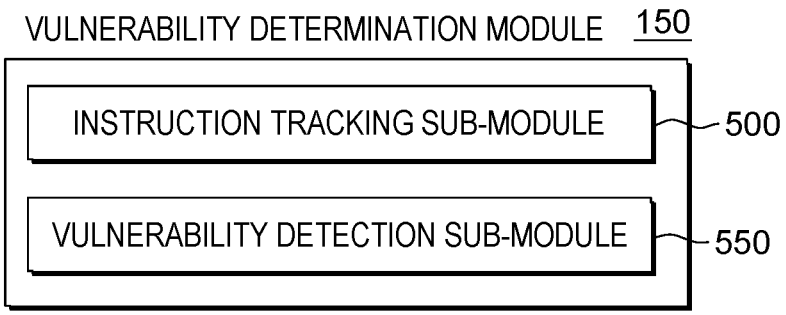
FIG. 5A depicts one example of sub-modules of a vulnerability determination module of FIG. 1, in accordance with one or more aspects of the present disclosure.

One example of vulnerability determination module 150 is described with reference to FIG. 5A. In one example, vulnerability determination module 150 includes an instruction tracking sub-module 500 used to track for a selected purpose (e.g., vulnerability analysis) selected identified instructions; and a vulnerability detection sub-module 550 to detect one or more vulnerabilities, if any, within one or more programs based on the tracking. Vulnerability determination module 150 may include additional, fewer and/or other sub-modules. Many variations are possible. Further, similar modules/sub-modules may be used for other selected purposes. Further details regarding instruction tracking sub-module 500 and vulnerability detection sub-module 550 are described with reference to FIGS. 5B-5C.

Figure 5B:
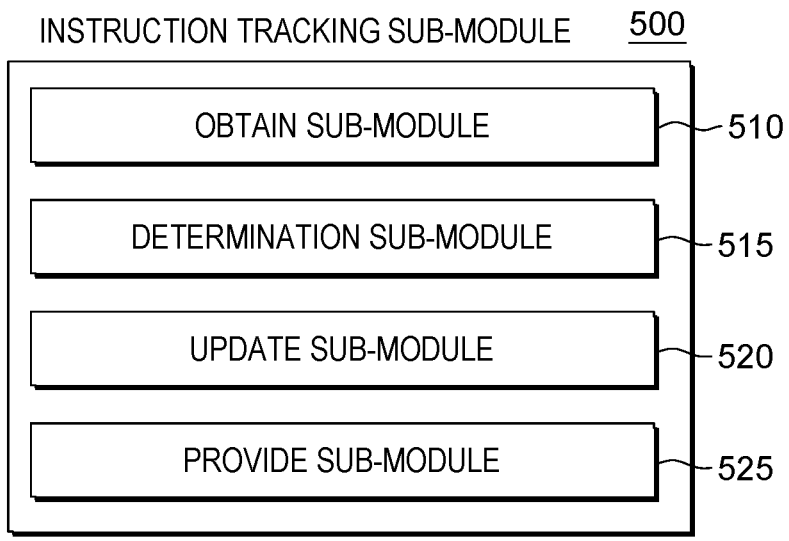
FIG. 5B depicts one example of sub-modules of an instruction tracking sub-module of the vulnerability determination module of FIG. 5A, in accordance with one or more aspects of the present disclosure.

Referring to FIG. 5B, in one example, an instruction tracking sub-module 500 includes an obtain sub-module 510 to obtain instruction processing information; a determination sub-module 515 to determine whether an instruction proceeding through the instruction pipeline is a selected transient instruction; an update sub-module 520 to update counters based on determining that the instruction is an identified transient instruction; and a provide sub-module 525 to provide information from the counters to be analyzed.

Instruction tracking sub-module 500 may include additional, fewer and/or other sub-modules. Many variations are possible.

Figure 5C:
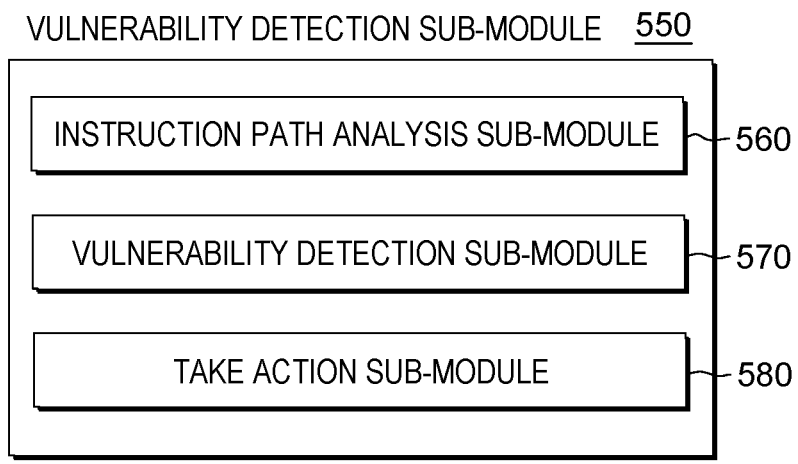
FIG. 5C depicts one example of sub-modules of a vulnerability detection sub-module of the vulnerability determination module of FIG. 5A, in accordance with one or more aspects of the present disclosure.

Referring to FIG. 5C, in one example, vulnerability detection sub-module 550 includes, for instance, an instruction path analysis sub-module 560 used to analyze information (e.g., information of one or more counters) to determine an instruction's path; a vulnerability detection sub-module 570 to detect whether there are vulnerabilities in a program; and a take action sub-module 580 to take action with respect to a detected vulnerability. Vulnerability detection sub-module 550 may include additional, fewer and/or other sub-modules. Many variations are possible.

One or more of the sub-modules (e.g., sub-modules 500-525) are used in an instruction tracking process to track selected instructions for a particular purpose (e.g., vulnerability analysis). In one example, referring to FIG. 6A, an instruction tracking process (e.g., instruction tracking process 600; also referred to as process 600) is used to track selected instructions of one or more programs for a selected purpose. Process 600 may be executed by and/or using one or more computing devices (e.g., one or more computers, such as computer(s) 101; one or more servers, such as remote server(s) 104; one or more devices, such as end user device(s) 103; one or more processors or nodes, such as processor(s) or node(s) of processor set 110; processing circuitry, such as processing circuitry 120 of processor set 110; a performance monitoring unit (e.g., performance monitoring unit 270) and/or other computing devices, etc.). Additional and/or other computers, servers, devices, processors, nodes, processing circuitry and/or computing devices may be used to execute the process and/or other aspects of the present disclosure. Many examples are possible.

Figure 6A:
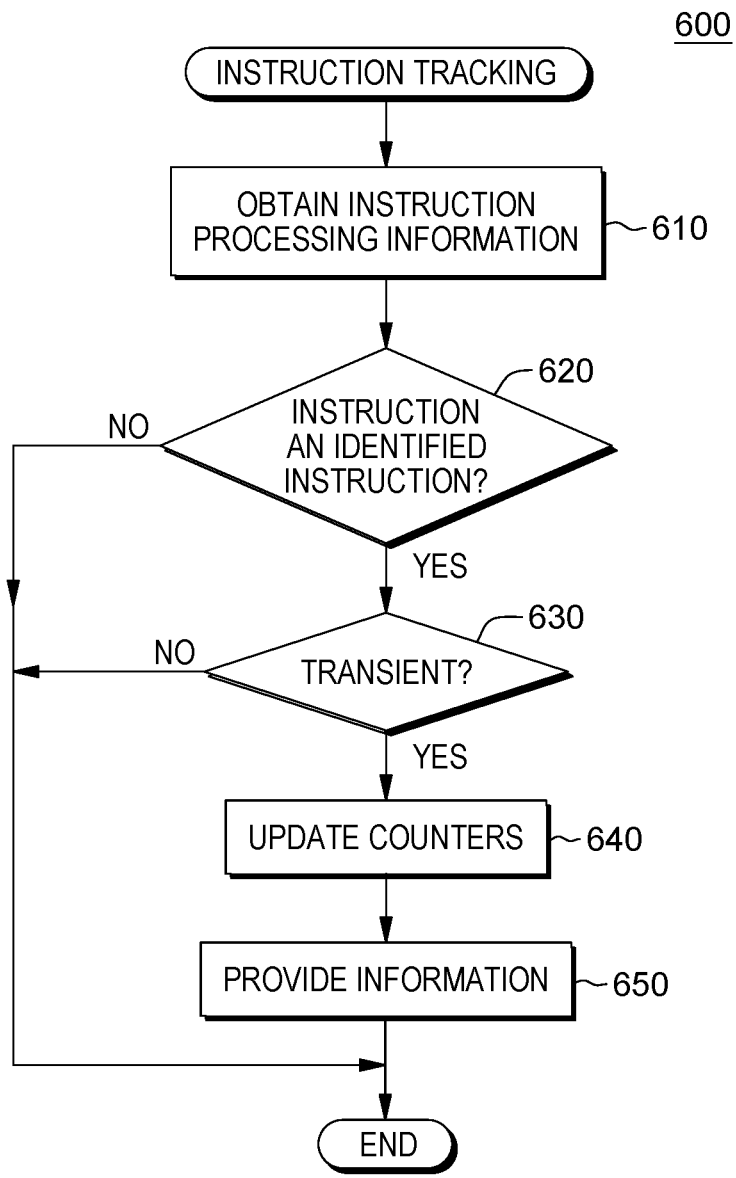
FIG. 6A depicts one example of an instruction tracking process, in accordance with one or more aspects of the present disclosure.

Referring to FIG. 6A, in one example, process 600 obtains 610 instruction processing information (e.g., an identifier of the instruction, an indication of whether the instruction is marked for tracking, etc.) regarding an instruction proceeding through instruction pipeline stages of the micro-architecture (e.g., stages 420-450). Process 600 determines 620 whether the instruction is an identified instruction. For instance, process 600 determines whether the instruction is a marker instruction, a marked instruction or an instruction otherwise identified for tracking. Based on process 600 determining that the instruction is an identified instruction, process 600 determines 630 whether the identified instruction is transient (e.g., rolled back; not committed). If the instruction is not an identified instruction or not transient, processing is complete. However, if the identified instruction is a transient instruction, then process 600 updates 640 one or more counters. For instance, one or more of counters 410 are updated reflecting that an identified transient instruction has been executed. In one example, as an identified instruction proceeds through the processing stages, the appropriate counter is updated. As examples, fetch counter 422 is incremented (e.g., by 1, another amount, etc.) when the identified instruction is fetched; decode counter 432 is incremented (e.g., by 1, another amount, etc.) when the identified instruction is decoded; execute counter 442 is incremented (e.g., by 1, another amount, etc.) when the identified instruction is executed; and rollback counter 452 is incremented (e.g., by 1, another amount, etc.) when the identified instruction is rolled back. These incremented counters reflect the processing of the identified instruction. Since it is determined that the identified instruction is transient, the counters remain incremented (as opposed to a retired instruction in which the counters may be decremented, if previously incremented when proceeding through the stages, such that the counters do not reflect the retired instruction). In another example, the counters are updated to reflect the processing of the identified instruction after it is confirmed that the instruction is transient. Other examples are possible.

Process 600 provides 650 information regarding the counters for analysis. The information includes, for instance, the pipeline stages through which the identified transient instructions proceeded, as well as other and/or different information. Further details regarding the analysis are described below with respect to one example of a vulnerability detection process.

One or more of the sub-modules (e.g., sub-modules 550-580) are used in a vulnerability detection process to determine whether there are vulnerabilities within a program and/or a processor. In one example, referring to FIG. 6B, a vulnerability detection process (e.g., vulnerability detection process 660; also referred to herein as process 660) is used to analyze paths of identified instructions within a program to determine whether there are vulnerabilities in the program and/or processor. Process 660 may be executed by and/or using one or more computing devices (e.g., one or more computers, such as computer(s) 101; one or more servers, such as remote server(s) 104; one or more devices, such as end user device(s) 103; one or more processors or nodes, such as processor(s) or node(s) of processor set 110; processing circuitry, such as processing circuitry 120 of processor set 110; and/or other computing devices, etc.). Additional and/or other computers, servers, devices, processors, nodes, processing circuitry and/or computing devices may be used to execute the process and/or other aspects of the present disclosure. Many examples are possible.

Figure 6B:
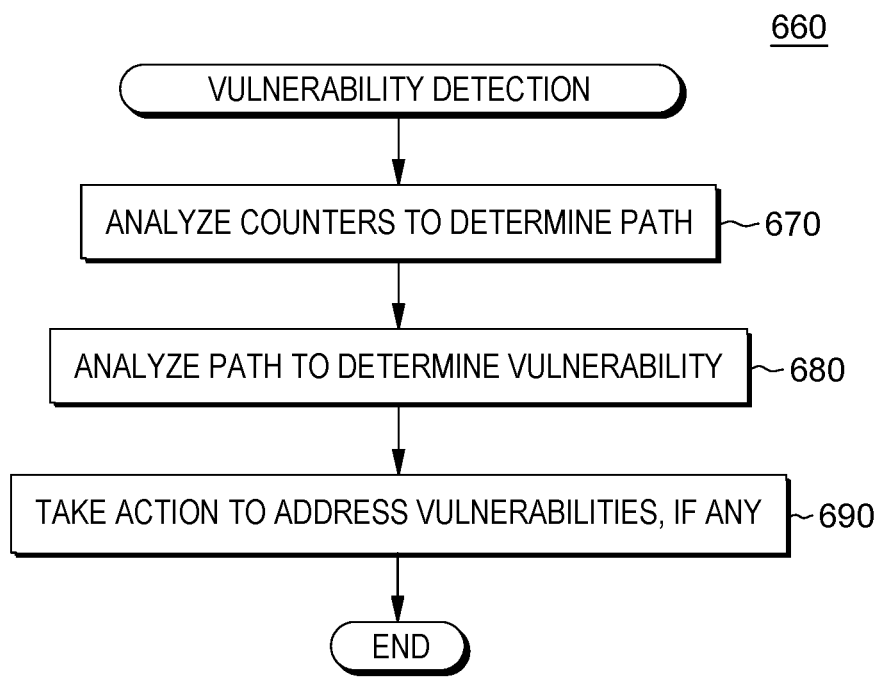
FIG. 6B depicts one example of a vulnerability detection process, in accordance with one or more aspects of the present disclosure.

Referring to FIG. 6B, in one example, at selected points in time, process 660 analyzes 670 one or more counters of the performance monitoring unit to determine one or more paths taken by one or more instructions. In one example, the counters indicate at what stage an instruction was when it was rolled back. Further, since at least one counter indicates that the instruction was reached within the program, process 660 may determine where the program was when a rollback occurred. For instance, it can determine a path of the instruction, including, for instance, one or more memory locations accessed.

Process 660 analyzes 680 the paths taken by the identified transient instructions to determine whether there are any vulnerabilities. For instance, an identified instruction may be steered to a particular location, and based on it reaching that location, a vulnerability is identified. Other examples are possible.

In one or more aspects, based on the analysis and a determination of one or more vulnerabilities, process 660 takes action 690 to address the one or more vulnerabilities. For example, process 660 deletes (e.g., automatically) the memory footprint of the executed instruction resulting in the vulnerability. As another example, process 660 modifies or at least initiates modification of the program that includes the identified transient instruction. The modification may be performed by, e.g., the compiler, a programmer, analyst, etc. Another action includes process 660 sending an alert regarding the vulnerability. Many other example actions are possible. Other variations and embodiments are possible.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement and/or perform instruction tracking processing, analysis processing, vulnerability detection processing and/or to implement and/or perform one or more other aspects of the present disclosure.

One or more aspects of the present disclosure are tied to computer technology and enhance processing within a computer, improving performance thereof. For instance, optimizations are provided by analyzing selected information provided by extended processing/extended performance monitoring units. Processing within a processor, computer system and/or computing environment is improved.

In accordance with one or more aspects, one or more counters are incremented only for identified instructions designed with the purpose of studying transient execution, and, in one example, the one or more counters are only incremented (or remain incremented) when the identified instruction is executed and does not retire; i.e., it is transiently executed.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instruction formats and/or operands may be used. Further, other ways to mark an instruction as an identified instruction may be used. Additionally, other types of performance units may be used. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for enhancing processing within a computing environment, the computer program product comprising:
   a set of one or more computer readable storage media; and
   program instructions, collectively stored in the set of one or more computer readable storage media, for causing at least one computing device to perform the following computer operations including:
      obtaining instruction processing information for an instruction of a computer program being executed by a processor of the computing environment;
      determining, based on obtaining the instruction processing information, that the instruction is an identified instruction selected to be tracked as the instruction proceeds through one or more instruction pipeline stages of a micro-architecture of the processor, wherein the instruction is identified to be tracked using a separate marker that marks the instruction as the identified instruction selected to be tracked;
      ascertaining that the identified instruction is transient, wherein the identified instruction is rolled back;
      updating, based on ascertaining that the identified instruction is transient, one or more counters of a performance monitoring unit coupled to the processor to reflect processing of the identified instruction in at least one instruction pipeline stage of the one or more instruction pipeline stages, wherein the one or more counters, based on the updating, exclusively reflect processing of identified instructions that are rolled back; and
      providing information from the one or more counters to be analyzed to determine a path of the identified instruction that is transient, the path to be used to determine whether one or more vulnerabilities exist within the program.

2. The computer program product of claim 1, wherein the one or more counters are updated to remove tracking of retired instructions.

3. The computer program product of claim 1, wherein the determining that the instruction is the identified instruction comprises detecting that the identified instruction is a marked instruction.

4. The computer program product of claim 3, wherein the detecting that the identified instruction is the marked instruction comprises detecting that the identified instruction is a marker instruction.

5. The computer program product of claim 3, wherein the detecting that the identified instruction is the marked instruction comprises detecting that the identified instruction is a particular instruction having a marker.

6. The computer program product of claim 1, wherein the determining that the instruction is the identified instruction comprises detecting, based on an address of the instruction, that the instruction is the identified instruction.

7. The computer program product of claim 1, wherein the one or more counters include a counter for a stage of the one or more instruction pipeline stages.

8. The computer program product of claim 1, wherein the one or more counters include a fetch counter for a fetch instruction pipeline stage, a decode counter for a decode instruction pipeline stage, an execute counter for an execute instruction pipeline stage, and a rollback counter for a rollback instruction pipeline stage.

9. The computer program product of claim 1, wherein the computer operations further comprise:
analyzing the information from the one or more counters to determine the path of the identified instruction; and
analyzing the path to determine a vulnerability of the program.

10. The computer program product of claim 9, wherein the computer operations further comprise taking action based on determining the vulnerability of the program.

11. A computer system for enhancing processing within a computing environment, the computer system comprising:
a processor; and
a performance monitoring unit coupled to the processor, the performance monitoring unit including program instructions for causing the performance monitoring unit to perform the following computer operations including:
obtaining instruction processing information for an instruction of a computer program being executed by the processor;
determining, based on obtaining the instruction processing information, that the instruction is an identified instruction selected to be tracked as the instruction proceeds through one or more instruction pipeline stages of a micro-architecture of the processor, wherein the instruction is identified to be tracked using a separate marker that marks the instruction as the identified instruction selected to be tracked;
ascertaining that the identified instruction is transient, wherein the identified instruction is rolled back;
updating, based on ascertaining that the identified instruction is transient, one or more counters of a performance monitoring unit coupled to the processor to reflect processing of the identified instruction in at least one instruction pipeline stage of the one or more instruction pipeline stages, wherein the one or more counters, based on the updating, exclusively reflect processing of identified instructions that are rolled back; and
providing information from the one or more counters to be analyzed to determine a path of the identified instruction that is transient, the path to be used to determine whether one or more vulnerabilities exist within the program.

12. The computer system of claim 11, wherein the one or more counters are updated to remove tracking of retired instructions.

13. The computer system of claim 11, wherein the determining that the instruction is the identified instruction comprises detecting that the identified instruction is a marked instruction.

14. The computer system of claim 11, wherein the determining that the instruction is the identified instruction comprises detecting, based on an address of the instruction, that the instruction is the identified instruction.

15. The computer system of claim 11, wherein the one or more counters include a counter for a stage of the one or more instruction pipeline stages.

16. A computer-implemented method of facilitating processing within a computing environment, the computer-implemented method comprising:
obtaining instruction processing information for an instruction of a computer program being executed by a processor of the computing environment;
determining, based on obtaining the instruction processing information, that the instruction is an identified instruction selected to be tracked as the instruction proceeds through one or more instruction pipeline stages of a micro-architecture of the processor wherein the instruction is identified to be tracked using a separate marker that marks the instruction as the identified instruction selected to be tracked;
ascertaining that the identified instruction is transient, wherein the identified instruction is rolled back;
updating, based on ascertaining that the identified instruction is transient, one or more counters of a performance monitoring unit coupled to the processor to reflect processing of the identified instruction in at least one instruction pipeline stage of the one or more instruction pipeline stages, wherein the one or more counters based on the updating, exclusively reflect processing of identified instructions that are rolled back; and
providing information from the one or more counters to be analyzed to determine a path of the identified instruction that is transient, the path to be used to determine whether one or more vulnerabilities exist within the program.

17. The computer-implemented method of claim 16, wherein the one or more counters are updated to remove tracking of retired instructions.

18. The computer-implemented method of claim 16, wherein the determining that the instruction is the identified instruction comprises detecting that the identified instruction is a marked instruction.

19. The computer-implemented method of claim 16, wherein the determining that the instruction is the identified instruction comprises detecting, based on an address of the instruction, that the instruction is the identified instruction.

20. The computer-implemented method of claim 16, wherein the one or more counters include a counter for a stage of the one or more instruction pipeline stages.

* * * * *